(12) United States Patent
Lai (10) Patent No.: US 10,829,341 B2
(45) Date of Patent: Nov. 10, 2020

(54) LOCKING MECHANISM FOR PET RETRACTOR

(71) Applicant: Taiwan Tarky Products Inc., Taichung (TW)

(72) Inventor: Fong-O Lai, Taichung (TW)

(73) Assignee: Taiwan Tarkey Products Inc., Taichung (TW)

( * ) Notice: Subject to any disclaimer, the term of this patent is extended or adjusted under 35 U.S.C. 154(b) by 133 days.

(21) Appl. No.: 16/128,562

(22) Filed: Sep. 12, 2018

(65) Prior Publication Data

US 2020/0079616 A1    Mar. 12, 2020

(51) Int. Cl.
*A01K 27/00* (2006.01)
*B65H 75/44* (2006.01)

(52) U.S. Cl.
CPC ....... *B65H 75/4431* (2013.01); *A01K 27/004* (2013.01)

(58) Field of Classification Search
CPC .... A01K 27/90; A01K 27/004; A01K 27/003; A01K 27/005; A01K 27/008; F41H 9/10
USPC .......................................... 119/792, 795–798
See application file for complete search history.

(56) References Cited

U.S. PATENT DOCUMENTS

| | | |
|---|---|---|
| 5,377,626 A | 1/1995 | Kilsby |
| 6,273,354 B1 | 8/2001 | Kovacik et al. |
| 6,352,213 B1 | 3/2002 | Sumiyashiki et al. |
| 6,530,536 B2 | 3/2003 | Sumiyashiki et al. |
| 6,694,922 B2 | 2/2004 | Walter et al. |
| 7,744,030 B2 | 6/2010 | Sumiyashiki |
| 7,784,728 B2 | 8/2010 | Shi |
| 8,516,979 B2 | 8/2013 | Ek |
| 8,651,411 B2* | 2/2014 | Wang ................... A01K 27/004 119/796 |
| 8,826,864 B2 | 9/2014 | Tang |
| 9,107,393 B2* | 8/2015 | Chung ................. A01K 27/004 |
| 9,326,490 B2 | 5/2016 | Shi |
| 9,414,572 B2 | 8/2016 | O'Brien et al. |
| 9,814,217 B2* | 11/2017 | Zhu ...................... A01K 27/004 |
| 2008/0230015 A1* | 9/2008 | Bleshoy ............... A01K 27/004 119/796 |
| 2011/0120388 A1* | 5/2011 | Shahbaz .............. A01K 27/006 119/796 |
| 2013/0200197 A1* | 8/2013 | Bogdahn .............. A01K 27/004 242/396 |
| 2013/0284114 A1* | 10/2013 | Bizzell ............... B65H 75/4434 119/796 |

(Continued)

*Primary Examiner* — Richard T Price, Jr.
(74) *Attorney, Agent, or Firm* — Browdy and Neimark, PLLC (57) ABSTRACT

A pet retractor includes a housing having an anchor, a rotary member rotatably engaged in the housing for engaging with a pet leash, a follower pivotally attached to the housing for engaging with the rotary member, a lever pivotally attached to the housing and having a knob engageable into and out of the housing, the lever includes a guide member engaged with the follower for pivoting the follower relative to the housing when the lever is pivoted relative to the housing and for actuating the hook of the follower to engage with and to be disengaged from the rotary member selectively, and a switch member is slidably engaged with the lever and engageable with the anchor for locking the lever and the follower and the switch member to the housing.

8 Claims, 6 Drawing Sheets

(56) References Cited

U.S. PATENT DOCUMENTS

| | | | |
|---|---|---|---|
| 2014/0238314 A1* | 8/2014 | O'Brien | A01K 27/004 |
| | | | 119/796 |
| 2015/0075447 A1* | 3/2015 | Chefetz | A01K 27/004 |
| | | | 119/796 |
| 2015/0237832 A1* | 8/2015 | O'Brien | A01K 27/004 |
| | | | 119/796 |
| 2016/0066545 A1* | 3/2016 | DeBien | A01K 27/004 |
| | | | 119/796 |
| 2016/0120152 A1* | 5/2016 | Zhu | A01K 27/004 |
| | | | 119/796 |

* cited by examiner

FIG. 10

LOCKING MECHANISM FOR PET RETRACTOR

BACKGROUND OF THE INVENTION

1. Field of the Invention

The present invention relates to a pet retractor or retracting leash, and more particularly to a pet retractor including a locking mechanism for solidly and stably locking and releasing the cable or cord and for preventing the parts or elements from moving or shifting relative to each other and for increasing the working life of the locking mechanism for the pet retractor.

2. Description of the Prior Art

Various kinds of typical retracting leash or pet retractors have been developed and provided for coiling or receiving and releasing the cable or cord for pet, and comprise a pulley rotatably received in a housing for winding or receiving the cable or cord for pet, and a locking mechanism attached or mounted to the housing for selectively engaging with the pulley and for locking and releasing the cable or cord for the pet.

For example, U.S. Pat. No. 5,377,626 A to Kilsby, U.S. Pat. No. 6,273,354 to Kovacik et al., U.S. Pat. No. 6,352,213 to Sumiyashiki et al., U.S. Pat. No. 6,530,536 to Sumiyashiki et al., U.S. Pat. No. 6,694,922 B2 to Walter et al., U.S. Pat. No. 7,744,030 to Sumiyashiki, U.S. Pat. No. 7,784,728 to Shi, U.S. Pat. No. 8,516,979 to Ek, U.S. Pat. No. 8,826,864 to Tang, U.S. Pat. No. 9,326,490 B2 to Shi, and U.S. Pat. No. 9,414,572 to O'Brien et al. disclose several of the typical retracting leash or pet retractors each also comprising a pulley rotatably received in a housing for receiving or engaging with the cable or cord for pet, and a locking mechanism attached or mounted to the housing for selectively engaging with the pulley and for locking and releasing the cable or cord for the pet.

However, the locking mechanism for the pet retractor includes a structure or configuration that may be easily and quickly damaged after use, and the cable or cord for the pet may not be solidly and stably locked to the housing after use.

The present invention has arisen to mitigate and/or obviate the afore-described disadvantages of the conventional retracting leash or pet retractors.

SUMMARY OF THE INVENTION

The primary objective of the present invention is to provide a pet retractor including a locking mechanism for solidly and stably locking and releasing the cable or cord for pet, and for preventing the parts or elements from moving or shifting relative to each other, and for being easily actuated or operated by the user, and for increasing the working life of the locking mechanism for the pet retractor.

In accordance with one aspect of the invention, there is provided a pet retractor comprising a housing including a chamber formed in the housing, and including a spindle provided in the chamber of the housing, and including a guide channel formed in the housing and communicating with the chamber of the housing, the housing including an anchor extended in the chamber of the housing, a rotary member rotatably engaged in the chamber of the housing for engaging with a pet leash, and the rotary member being rotatably engaged with the spindle of the housing, and a lock device including a follower pivotally attached to the housing with an axle, the follower including a hook for engaging with the rotary member selectively and for preventing the rotary member from being rotated backwardly relative to the housing, a lever pivotally attached to the housing with a shaft, the lever including a knob slidably received and engaged in the guide channel of the housing and engageable into and out of the chamber of the housing, the lever including a passage formed in the knob, the lever including a guide member engaged with the follower for pivoting the follower relative to the housing when the lever is pivoted relative to the housing and for actuating the hook of the follower to engage with and to be disengaged from the rotary member selectively, and a switch member slidably engaged with the passage of the knob and slidable relative to the knob of the lever, the switch member is engageable with the anchor of the housing for locking the lever and the follower and the switch member to the housing selectively and for preventing the leash from being pulled out of the housing inadvertently.

The rotary member includes a number of ratchet teeth extended from the rotary member for selectively engaging with the hook of the follower and for allowing the follower to anchor or lock the rotary member to the housing selectively. The follower includes a groove formed in the follower for slidably receiving and engaging with the guide member.

The lever includes an arm extended from the lever and engaged into the chamber of the housing, the guide member is attached to the arm of the lever and engaged with the follower for pivoting the follower relative to the housing when the lever is pivoted relative to the housing.

The switch member includes a recess formed in the switch member for slidably receiving and engaging with the anchor of the housing and for anchoring the switch member to the housing at a selected position. The switch member includes a projection for selectively engaging with the anchor of the housing.

The lever includes a peripheral flange for forming or defining the passage of the lever, and the switch member includes a pathway formed in the switch member for slidably receiving or engaging with the peripheral flange of the knob and for guiding and limiting the switch member to move relative to the knob and/or for locking the lever and the follower and the switch member to the housing selectively.

The housing includes a spring biasing element engaged between the knob of the lever and the housing for biasing and forcing the knob out through the guide channel of the housing and for disengaging the hook of the follower from the rotary member selectively.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Referring to the drawings, and initially to FIGS. 1-5, a pet retractor in accordance with the present invention comprises an outer receptacle or housing 10 including a hand grip or handle 11 formed or provided thereon for being gripped or grasped or held by the user and for allowing the user to actuate or operate the pet retractor, the housing 10 includes a compartment or chamber 12 formed therein, and includes a hub or spindle 13 formed or provided therein or extended in the chamber 12 of the housing 10, and includes a guide member 14 having a guide slot 15 formed therein and communicating with the chamber 12 of the housing 10 for slidably receiving or engaging with a belt or leash 80 for pet or the like. A safety snap hook device (not illustrated) and a stop (not illustrated) may be attached or mounted to the outer or free end portion of the leash 80.

The housing 10 further includes a guide groove or channel 16 formed therein (FIGS. 3-7) and also communicating with the chamber 12 of the housing 10, and includes a hub or shaft or axle 17 and a guide tongue or projection or anchor 18 extended to the chamber 12 of the housing 10 and spaced from each other. A pulley or rotary member 20 is rotatably received or engaged in the chamber 12 of the housing 10 and rotatably engaged onto or with the spindle 13 of the housing 10 for winding or receiving or engaging with the pet leash 80, and the rotary member 20 may thus be rotatable relative to the housing 10 around the spindle 13 of the housing 10, a spring biasing member (not illustrated) may be disposed or engaged in the rotary member 20 and mounted or secured between the rotary member 20 and the spindle 13 of the housing 10 for biasing and forcing the rotary member 20 to rotate relative to the housing 10 or for recovering the rotary member 20.

For example, the rotary member 20 includes a number of ratchet teeth 21 extended axially and outwardly therefrom, such as extended axially and outwardly from the outer peripheral portion of the rotary member 20 for engaging with a latch or lock device 3 and for limiting or guiding the rotary member 20 to rotate relative to the housing 10, which will be described in further details hereinafter. The above-described structure or configuration for the rotary member 20 and the spring biasing member for biasing and forcing the rotary member 20 is typical and is not related to the present invention and will not be described in further details. The lock device 3 may be provided for latching or locking the rotary member 20 and the leash 80 to the housing 10 and for preventing the leash 80 from being pulled out of the housing 10 inadvertently.

Figure 1:
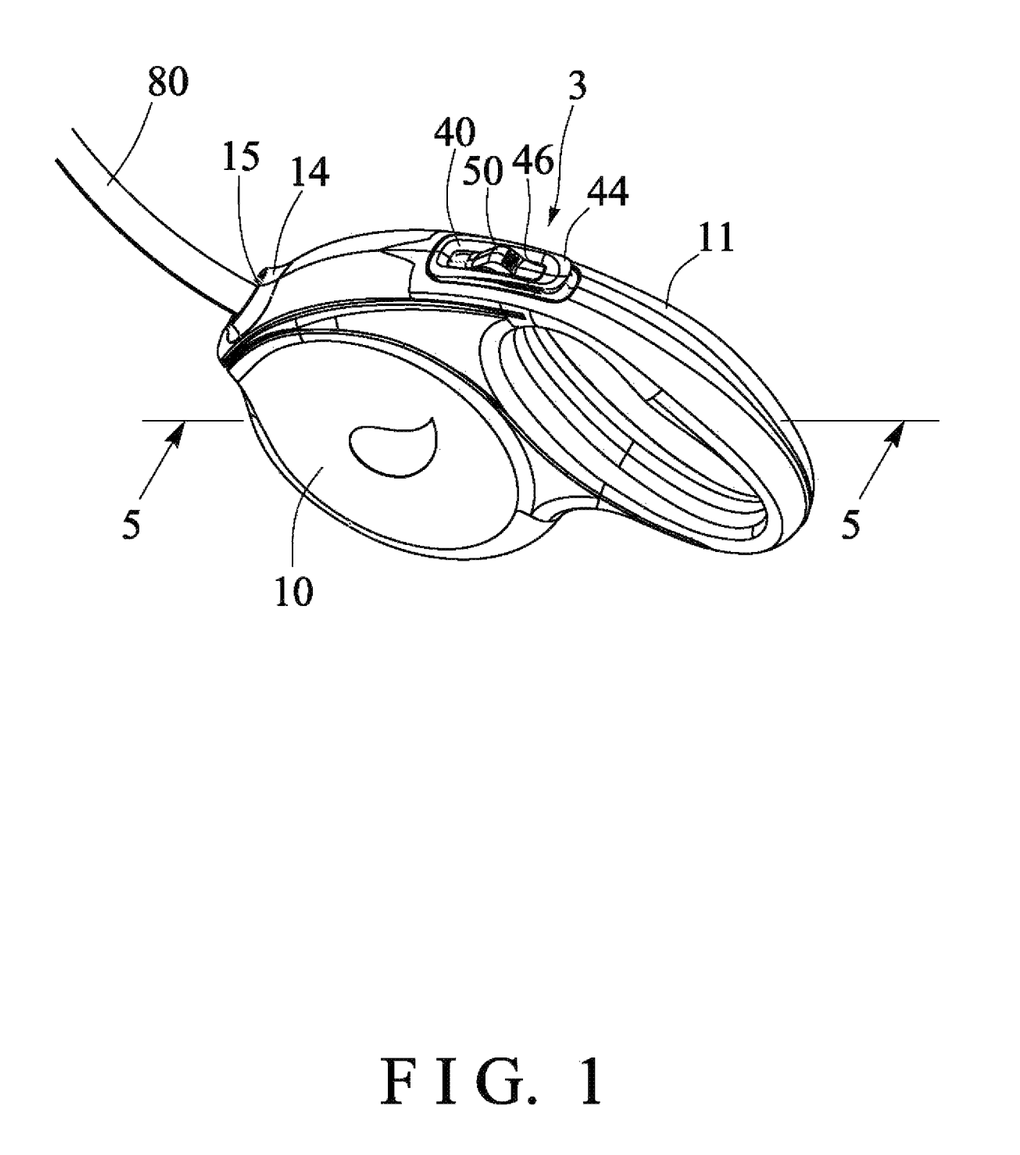
FIG. 1 is a perspective view of a pet retractor in accordance with the present invention.
Figure 2:
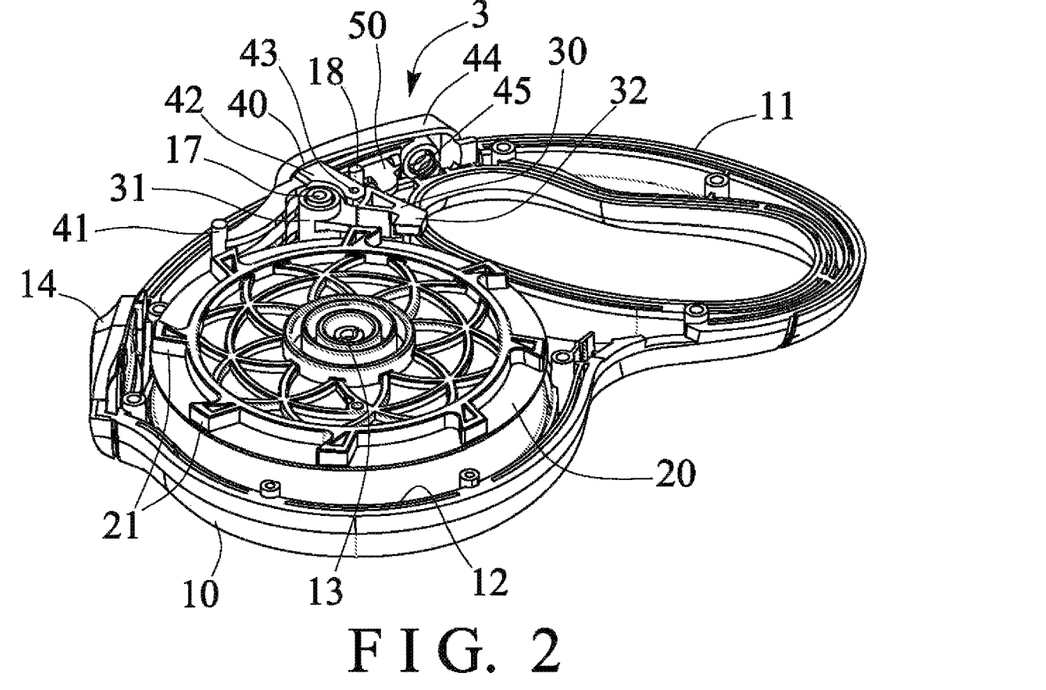
FIG. 2 is another perspective view of the pet retractor, in which a portion of the housing has been removed for showing the inner structure of the pet retractor.
Figure 3:
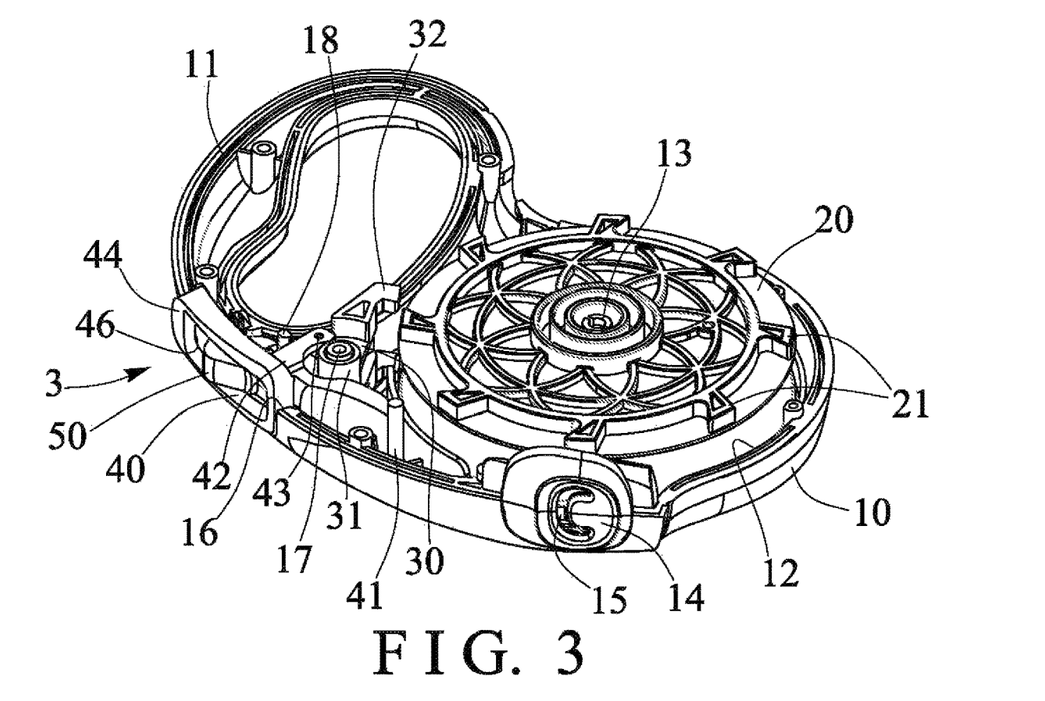
FIG. 3 is a further perspective view of the pet retractor, as seen from a different angle as that shown in FIG. 2.
Figure 4:
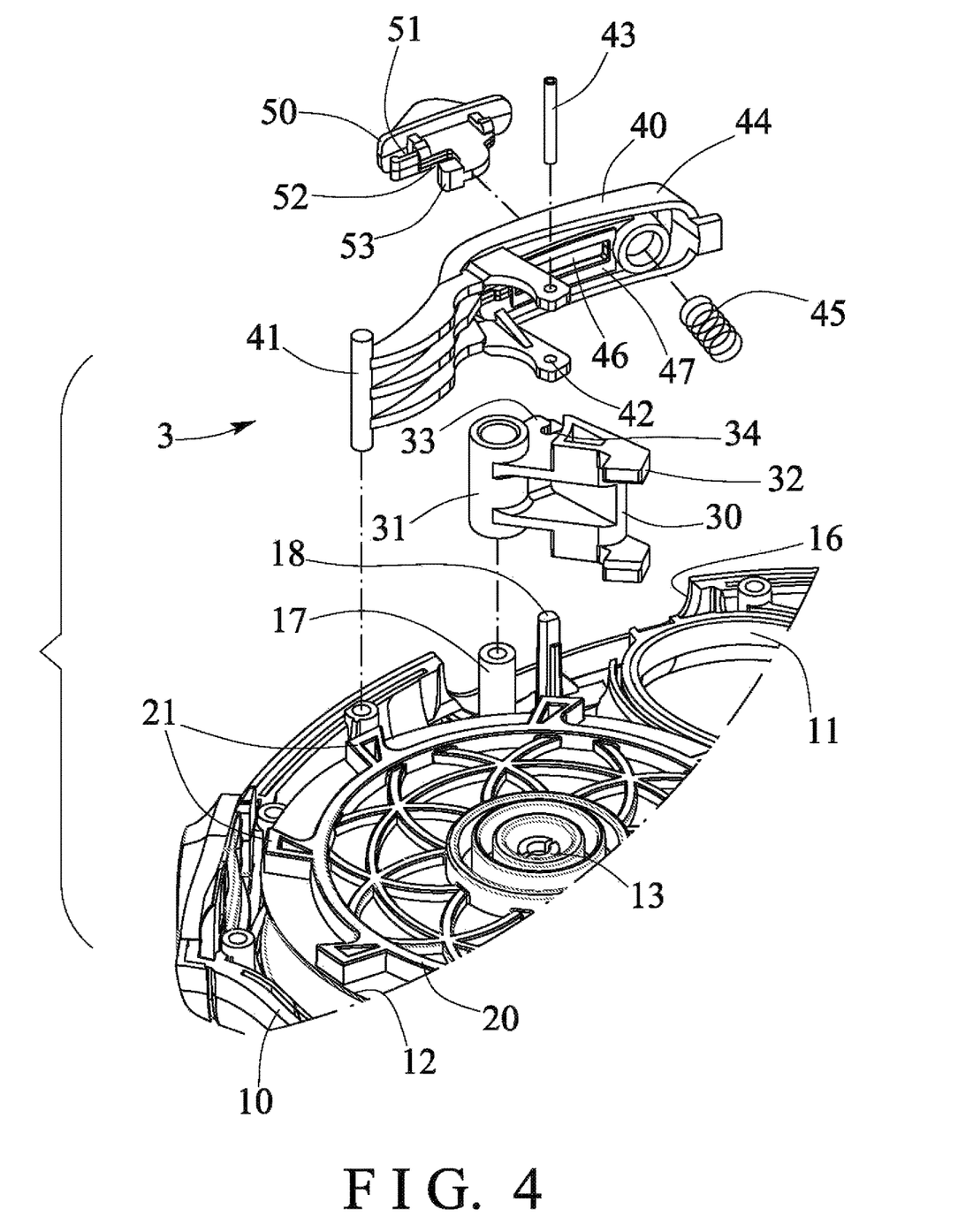
FIG. 4 is a partial exploded view of the pet retractor.
Figure 5:
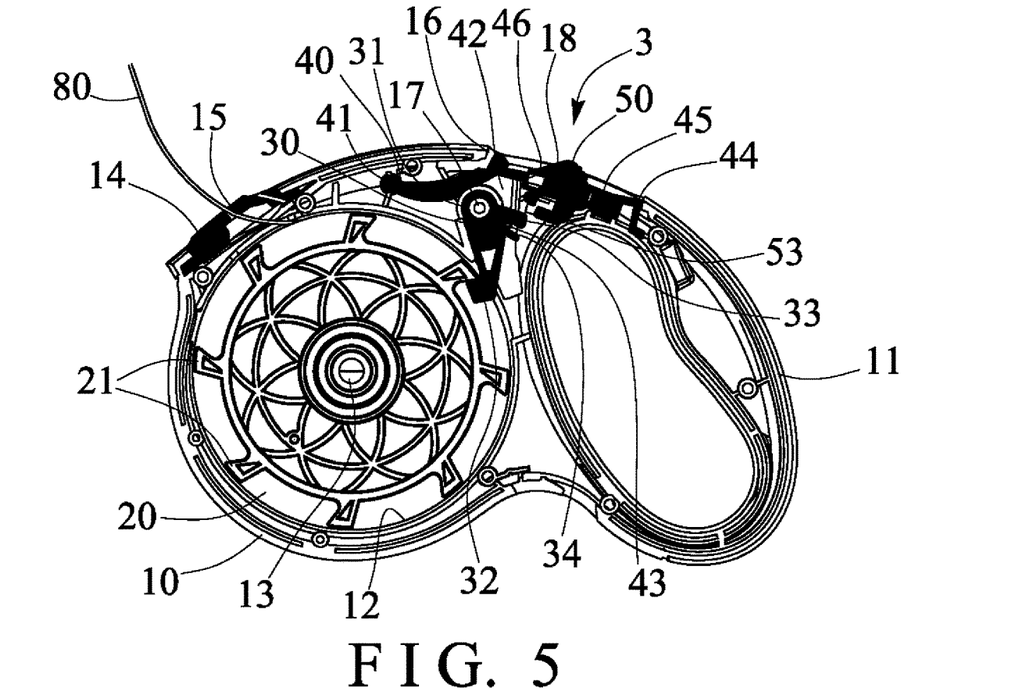
FIG. 5 is a cross sectional view of the pet retractor, taken along lines 5-5 of FIG. 1.
Figure 7:
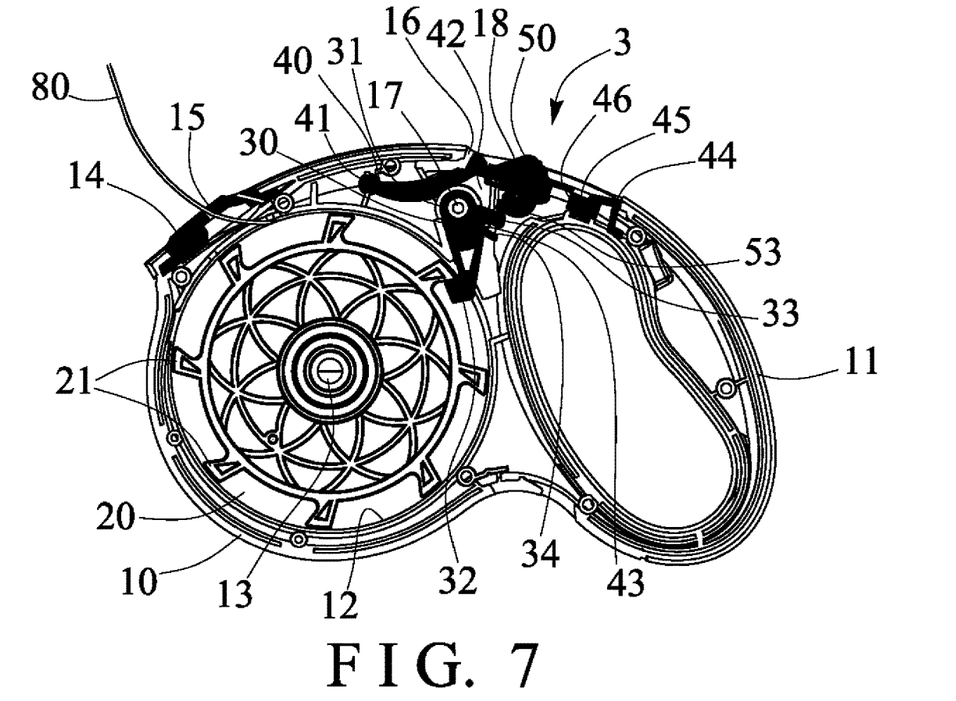

The lock device 3 includes a catch member or follower 30 pivotally or rotatably attached or mounted or secured to the housing 10, for example, the follower 30 is received or engaged in the chamber 12 of the housing 10 and includes a hub or barrel 31 formed or provided on one end portion thereof and pivotally or rotatably engaged onto the axle 17 of the housing 10 for allowing the follower 30 to be pivotally or rotatably attached or mounted or secured to the housing 10 with the axle 17, the follower 30 includes one or more (such as two) ratchet teeth or anchors or hooks 32 extended therefrom for selectively contacting or engaging with the ratchet teeth 21 of the rotary member 20, best shown in FIGS. 5 and 7, and for preventing the rotary member 20 from being pivoted or rotated backwardly relative to the housing 10, and thus for preventing the leash 80 from being pulled out of the housing 10 inadvertently.

The follower 30 further includes a bulge or protrusion 33 formed or provided thereon and/or extended therefrom, and includes a guide channel or slot or groove 34 formed therein and opened or directed away from the axle 17 or the barrel 31. A cantilever beam or lever 40 is pivotally or rotatably attached or mounted or secured to the housing 10 with an axle or shaft 41 and pivotally or slidably received or engaged in the guide channel 16 of the housing 10 and extendible or engageable or movable into or out of the chamber 12 of the housing 10, and includes one or more (such as two) legs or arms 42 extended therefrom and engaged into the chamber 12 of the housing 10, and includes a guide pin or actuator or guide member 43 attached or mounted or secured to the arms 42 of the lever 40 and slidably received or engaged in the groove 34 of the follower 30 or engaged with the follower 30 for pivoting or rotating the follower 30 relative to the housing 10 and the rotary member 20.

Figure 6:
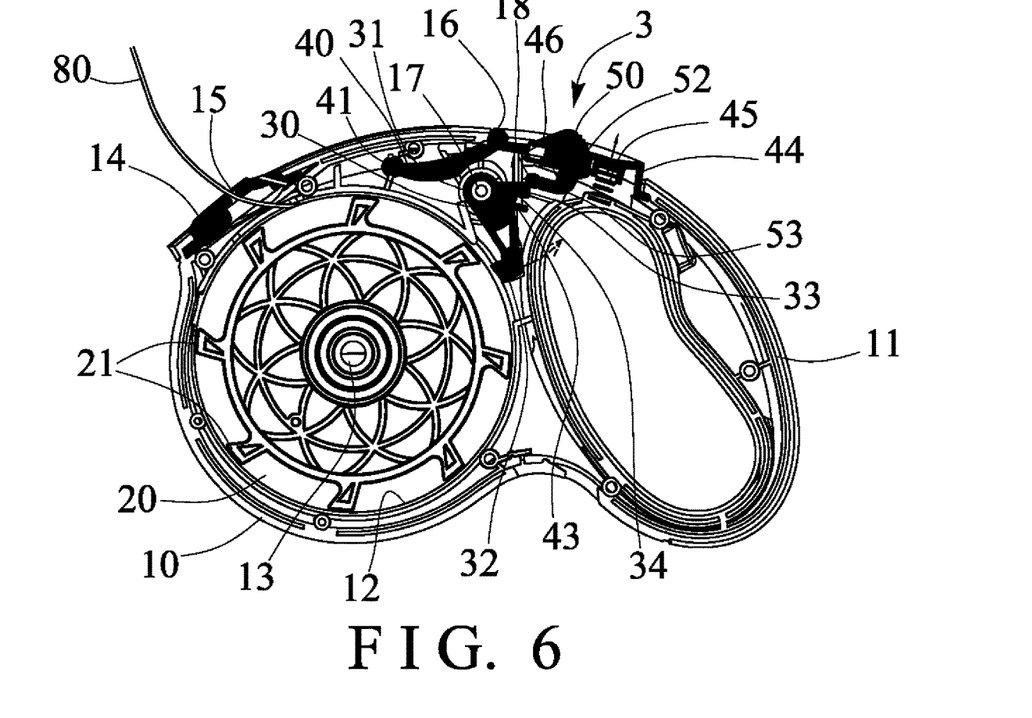
FIGS. 6, 7 are cross sectional views similar to FIG. 5, illustrating the operation of the pet retractor.
Figure 8:
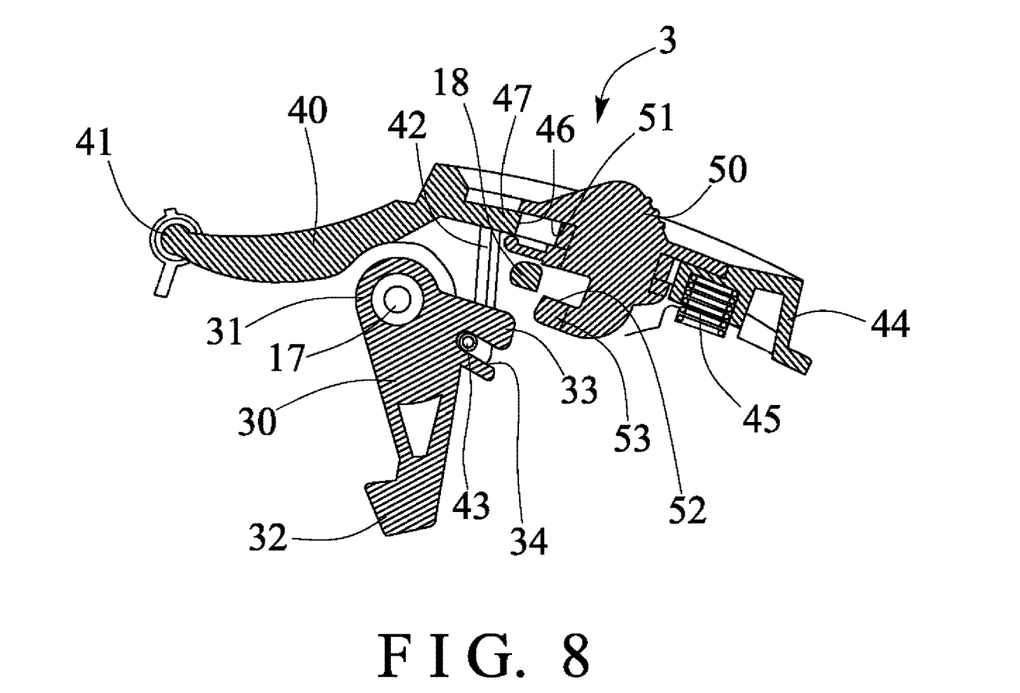
FIGS. 8, 9, 10 are enlarged partial cross sectional views of the pet retractor as shown in FIGS. 5, 6, 7 respectively.
Figure 9:
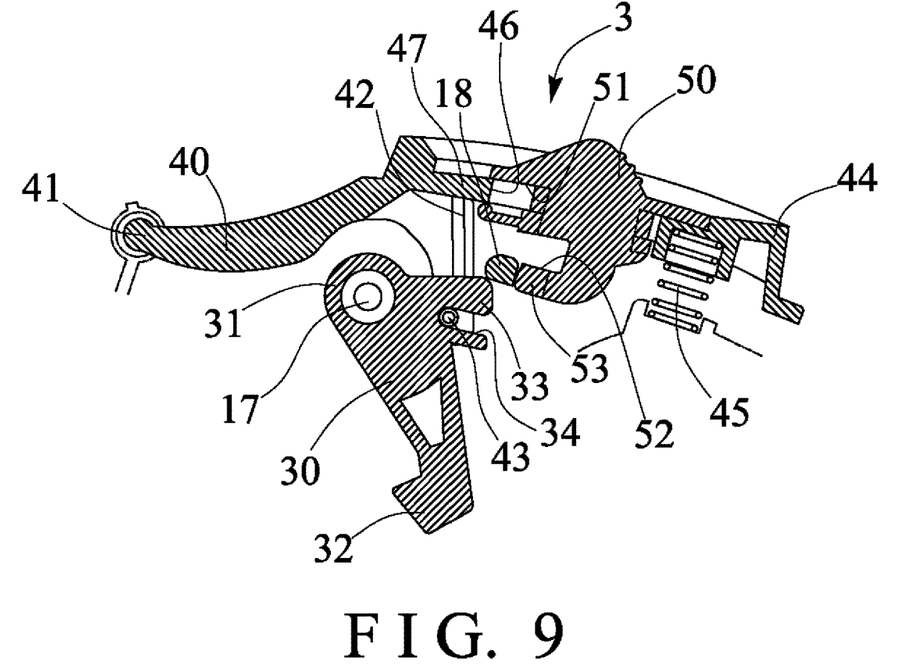

For example, as shown in FIGS. 6 and 9, when the lever 40 is pivoted or rotated relative to the housing 10 counter clockwise, or in one direction to be extended out of the guide channel 16 of the housing 10, the guide member 43 of the lever 40 may pivot or rotate or move the follower 30 counter clockwise in order to disengage or separate the hooks 32 of the follower 30 from the ratchet teeth 21 of the rotary member 20 and so as to release the rotary member 20, and thus for allowing the rotary member 20 to be pivoted or rotated relative to the housing 10 and thus for allowing the leash 80 to be pulled out of the housing 10. On the contrary, as shown in FIGS. 5, 8; and 7, 10, when the lever 40 is pivoted or rotated relative to the housing 10 clockwise, or in an opposite direction to be engaged into the guide channel 16 of the housing 10, the guide member 43 of the lever 40 may pivot or rotate or move the follower 30 clockwise in order to force or actuate the hooks 32 of the follower 30 to engage with the ratchet teeth 21 of the rotary member 20 and so as to lock the rotary member 20 to the housing 10.

For example, the lever 40 is received or engaged in the chamber 12 of the housing 10 and includes a button or knob 44 slidably received or engaged in the guide channel 16 of the housing 10 and extendible or engageable or movable into or out of the chamber 12 of the housing 10 through the guide channel 16 of the housing 10. A spring biasing element 45 is disposed or engaged between the knob 44 or the lever 40 and the housing 10 for biasing and forcing or moving the knob 44 out through the guide channel 16 of the housing 10 (FIGS. 6, 9), and thus for disengaging or separating the hooks 32 of the follower 30 from the ratchet teeth 21 of the rotary member 20 selectively. The lever 40 further includes an oblong hole or slot or passage 46 formed therein, such as formed in the knob 44 and formed or defined by a peripheral wall or flange 47, for slidably receiving or engaging with an actuating knob or button or switch member 50.

The switch member 50 is slidably attached or mounted or secured to the knob 44 or the lever 40, such as slidably engaged with the passage 46 of the knob 44 or of the lever 40, and includes another passage or pathway 51 formed therein for slidably receiving or engaging with the peripheral flange 47 of the knob 44 or of the lever 40 and for guiding and limiting the switch member 50 to slide or move relative to the knob 44 or the lever 40, and for allowing the switch member 50 to be guided and limited to slide and move longitudinally along the passage 46 of the knob 44 or of the lever 40, and includes a depression or recess 52 formed therein for slidably receiving or engaging with the anchor 18 of the housing 10 (FIGS. 7, 10) and for anchoring or retaining or positioning the switch member 50 to the housing 10 at the selected or predetermined or required position or location. The switch member 50 further includes an anchor or stop or projection 53 formed or provided thereon or extended therefrom for selectively engaging with the anchor 18 of the housing 10 ((FIGS. 6, 9; and 7, 10) and/or the protrusion 33 of the follower 30 (FIGS. 7, 10), and for locking the lever 40 and the follower 30 and the switch member 50 to the housing 10.

In operation, as shown in FIGS. 6 and 9, when the switch member 50 is released and disengaged or separated from the anchor 18 of the housing 10, the spring biasing element 45 may bias and force and move the knob 44 of the lever 40 out through the guide channel 16 of the housing 10, and the hooks 32 of the follower 30 may then be moved or disengaged or separated from the ratchet teeth 21 of the rotary member 20 selectively by or with the guide member 43 of the lever 40, at this moment, the rotary member 20 is released and may be pivoted or rotated relative to the housing 10 freely, and thus for allowing the leash 80 to be pulled out of the housing 10 and/or to be received or engaged onto the rotary member 20. As shown in FIGS. 5 and 8, when the knob 44 or the lever 40 is depressed or engaged into the guide channel 16 of the housing 10, the guide member 43 of the lever 40 may force or actuate the hooks 32 of the follower 30 to engage with the ratchet teeth 21 of the rotary member 20 and to lock the rotary member 20 to the housing 10.

Figure 10:
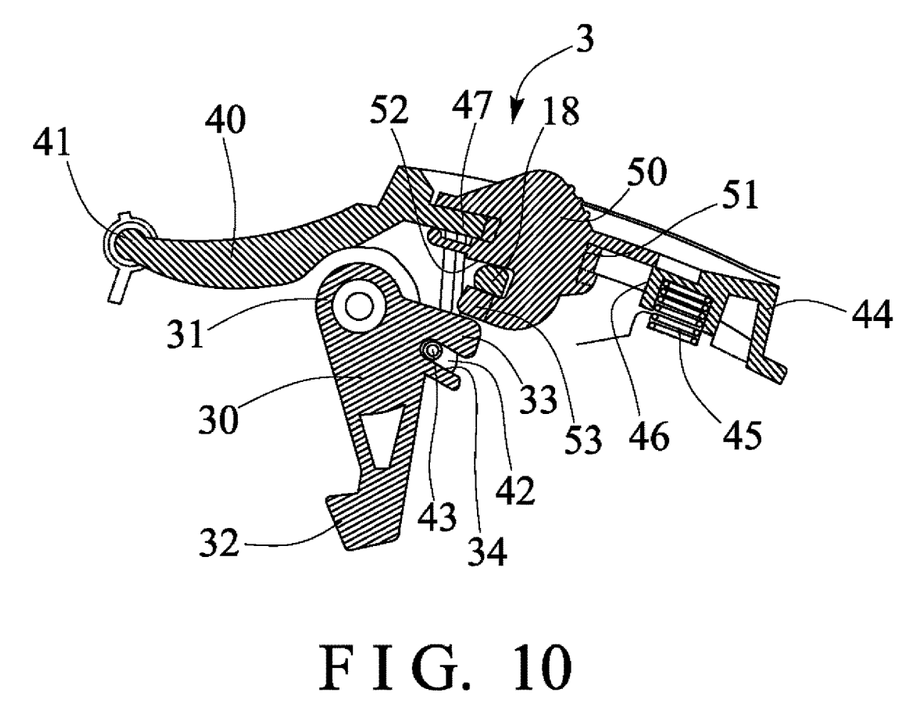

As shown in FIGS. 7 and 10, when the switch member 50 is moved forwardly relative to the lever 40 and/or along the lever 40, the anchor 18 of the housing 10 may be received or engaged into the recess 52 of the switch member 50 in order to anchor or retain or position or lock the lever 40 and the switch member 50 to the housing 10 at the selected or predetermined or required position or location. At this moment, the projection 53 of the switch member 50 may further be engaged with the anchor 18 of the housing 10 and/or the protrusion 33 of the follower 30, and/or engaged between the anchor 18 of the housing 10 and the protrusion 33 of the follower 30, and for further solidly and stably locking the lever 40 and the follower 30 and the switch member 50 to the housing 10, and for preventing the rotary member 20 from being pivoted or rotated backwardly relative to the housing 10, and for preventing the leash 80 from being pulled out of the housing 10 inadvertently.

It is to be noted that the knob 44 or the lever 40 may be easily and quickly and readily depressed and forced to move into the guide channel 16 of the housing 10 with such as the thumb of the user when the user grasps and holds the handle 11 of the housing 10, and the switch member 50 may also be easily and quickly and readily moved forwardly relative to the lever 40 with such as the thumb of the user, such that the lock device 3 may be easily and quickly and readily actuated or operated by the user, and the working life of the lock device 3 for the pet retractor may be suitably increased.

Accordingly, the pet retractor in accordance with the present invention includes a locking mechanism for solidly and stably locking and releasing the cable or cord, and for preventing the parts or elements from moving or shifting relative to each other, and for being easily actuated or operated by the user, and for increasing the working life of the locking mechanism for the pet retractor.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pet retractor comprising:
   a housing including a chamber formed in said housing, and including a spindle provided in said chamber of said housing, and including a guide channel formed in said housing and communicating with said chamber of said housing, said housing including an anchor extended in said chamber of said housing;
   a rotary member rotatably engaged in said chamber of said housing for engaging with a pet leash, and said rotary member being rotatably engaged with said spindle of said housing, and
   a lock device including:
      a follower pivotally attached to said housing with an axle, said follower including a hook for engaging with said rotary member selectively and for preventing said rotary member from being rotated backwardly relative to said housing;
      a lever pivotally attached to said housing with a shaft, said lever including a knob slidably received and engaged in said guide channel of said housing and engageable into and out of said chamber of said housing, said lever including a passage formed in said knob, said lever including a guide member engaged with said follower for pivoting said follower relative to said housing when said lever is pivoted relative to said housing and for actuating said hook of said follower to engage with and to be disengaged from said rotary member selectively; and
      a switch member slidably engaged with said passage of said knob and slidable relative to said knob of said lever, said switch member being engageable with said anchor of said housing selectively for locking said lever and said follower and said switch member to said housing.

2. The pet retractor as claimed in claim 1, wherein said rotary member includes a plurality of ratchet teeth extended from said rotary member for selectively engaging with said hook of said follower.

3. The pet retractor as claimed in claim 1, wherein said follower includes a groove formed in said follower for slidably receiving and engaging with said guide member.

4. The pet retractor as claimed in claim 1, wherein said lever includes an arm extended from said lever and engaged into said chamber of said housing, said guide member is attached to said arm of said lever and engaged with said follower for pivoting said follower relative to said housing when said lever is pivoted relative to said housing.

5. The pet retractor as claimed in claim 1, wherein said switch member includes a recess formed in said switch member for slidably receiving and engaging with said anchor of said housing and for anchoring said switch member to said housing at a selected position.

6. The pet retractor as claimed in claim 1, wherein said switch member includes a projection for selectively engaging with said anchor of said housing.

7. The pet retractor as claimed in claim 1, wherein said lever includes a peripheral flange for forming said passage of said lever, and said switch member includes a pathway formed in said switch member for slidably engaging with said peripheral flange of said knob and for guiding and limiting said switch member to move relative to said knob.

8. The pet retractor as claimed in claim 1, wherein said housing includes a spring biasing element engaged between said knob of said lever and said housing for biasing and forcing said knob out through said guide channel of said housing and for disengaging said hook of said follower from said rotary member selectively.

\* \* \* \* \*